(12) United States Patent
Roberts et al.

(10) Patent No.: US 11,336,154 B2
(45) Date of Patent: May 17, 2022

(54) STATOR FOR AN ELECTRIC MOTOR OR GENERATOR

(71) Applicant: PROTEAN ELECTRIC LIMITED, Surrey (GB)

(72) Inventors: Gareth Roberts, South Heighton (GB); Jamie Bell, Berkshire (GB); John P. Foulsham, Hampshire (GB)

(73) Assignee: PROTEAN ELECTRIC LIMITED, Surrey (GB)

( * ) Notice: Subject to any disclaimer, the term of this patent is extended or adjusted under 35 U.S.C. 154(b) by 1102 days.

(21) Appl. No.: 15/521,451

(22) PCT Filed: Oct. 20, 2015

(86) PCT No.: PCT/IB2015/058068
§ 371 (c)(1),
(2) Date: Apr. 24, 2017

(87) PCT Pub. No.: WO2016/067156
PCT Pub. Date: May 6, 2016

(65) Prior Publication Data
US 2017/0324307 A1     Nov. 9, 2017

(30) Foreign Application Priority Data

Oct. 31, 2014    (GB) ..................................... 1419416

(51) Int. Cl.
*H02K 1/18*         (2006.01)
*H02K 11/25*      (2016.01)
(Continued)

(52) U.S. Cl.
CPC ............. *H02K 11/25* (2016.01); *H02K 1/148* (2013.01); *H02K 5/225* (2013.01); *H02K 11/33* (2016.01); *H02K 1/187* (2013.01)

(58) Field of Classification Search
CPC ........ H02K 11/25; H02K 1/148; H02K 11/30; H02K 11/33; H02K 2213/12; H02K 5/22;
(Continued)

(56) References Cited

U.S. PATENT DOCUMENTS

| | | | | |
|---|---|---|---|---|
| 4,203,045 A | * | 5/1980 | Buchanan | H02K 11/25 310/680 |
| 4,313,069 A | * | 1/1982 | Szabo | H02K 11/25 310/680 |

(Continued)

FOREIGN PATENT DOCUMENTS

| | | |
|---|---|---|
| EP | 2043234 A1 | 4/2009 |
| EP | 2306622 A1 | 4/2011 |

(Continued)

OTHER PUBLICATIONS

European Patent Office, International Search Report, dated Jan. 19, 2016, WIPO, Rijswijk.
(Continued)

*Primary Examiner* — Quyen P Leung
*Assistant Examiner* — Alexander Moraza
(74) *Attorney, Agent, or Firm* — Nolte Lackenbach Siegel

(57) ABSTRACT

A stator for an electric motor or generator, the stator comprising a circumferential support having a plurality of first engagement elements distributed about the circumferential support, a first resiliently deformable element having a first temperature sensing element mounted on the circumferential support, a plurality of teeth for receiving coil windings, wherein each tooth includes a second engagement element to allow engagement with a first engagement element on the circumferential support for allowing each tooth to be mounted on the circumferential support, wherein coil windings on a tooth are arranged to engage with the first temperature sensing element when the tooth is being
(Continued)

mounted to the circumferential support with the first resiliently deformable element being arranged to deform upon the coil windings on the tooth engaging with the first temperature sensing element to move the temperature sensing element from a first position to a second position.

20 Claims, 17 Drawing Sheets

(51) Int. Cl.
    *H02K 11/33*     (2016.01)
    *H02K 5/22*     (2006.01)
    *H02K 1/14*     (2006.01)

(58) Field of Classification Search
    CPC ........ H02K 5/225; H01H 37/18; H01H 37/32; H01H 2037/5481; H01H 2037/5454
    USPC ................ 310/680, 71; 337/317; 361/27
    See application file for complete search history.

(56) References Cited

U.S. PATENT DOCUMENTS

| | | | | |
|---|---|---|---|---|
| 4,588,912 A * | 5/1986 | Shinmura | ............... | H02K 29/08 310/43 |
| 7,402,925 B2 * | 7/2008 | Best | ................ | H02K 3/522 310/67 R |
| 2011/0080072 A1 * | 4/2011 | Strobel | ................ | H02K 11/25 310/680 |
| 2013/0049498 A1 * | 2/2013 | Boughtwood | .......... | B60L 3/102 310/59 |
| 2013/0106251 A1 * | 5/2013 | Kaneshige | ............. | G01K 13/00 310/68 B |
| 2013/0200746 A1 * | 8/2013 | Foulsham | ............. | H02K 1/148 310/216.007 |
| 2013/0320817 A1 | 12/2013 | Marschall et al. | | |
| 2014/0254632 A1 | 9/2014 | Kaneshige et al. | | |
| 2014/0333185 A1 * | 11/2014 | Lindblom | ............. | H02K 11/25 310/680 |

FOREIGN PATENT DOCUMENTS

| | | | | |
|---|---|---|---|---|
| EP | 2309622 A1 | 4/2011 | | |
| GB | 2477520 A * | 8/2011 | ........... | H02K 15/062 |
| GB | 2477520 A | 8/2011 | | |

OTHER PUBLICATIONS

European Patent Office, Written Opinion of the International Searching Authority, dated May 6, 2016, WIPO, Berlin.
Intellectual Property Office, Combined Search and Examination Report, dated Nov. 21, 2014, IPO, Newport, South Wales.
Intellectual Property Office, Exam Report Standard, dated Jan. 30, 2017, IPO, Newport, South Wales.
Intellectual Property Office, Search Report First, dated Nov. 20, 2014, IPO, Newport, South Wales.

* cited by examiner

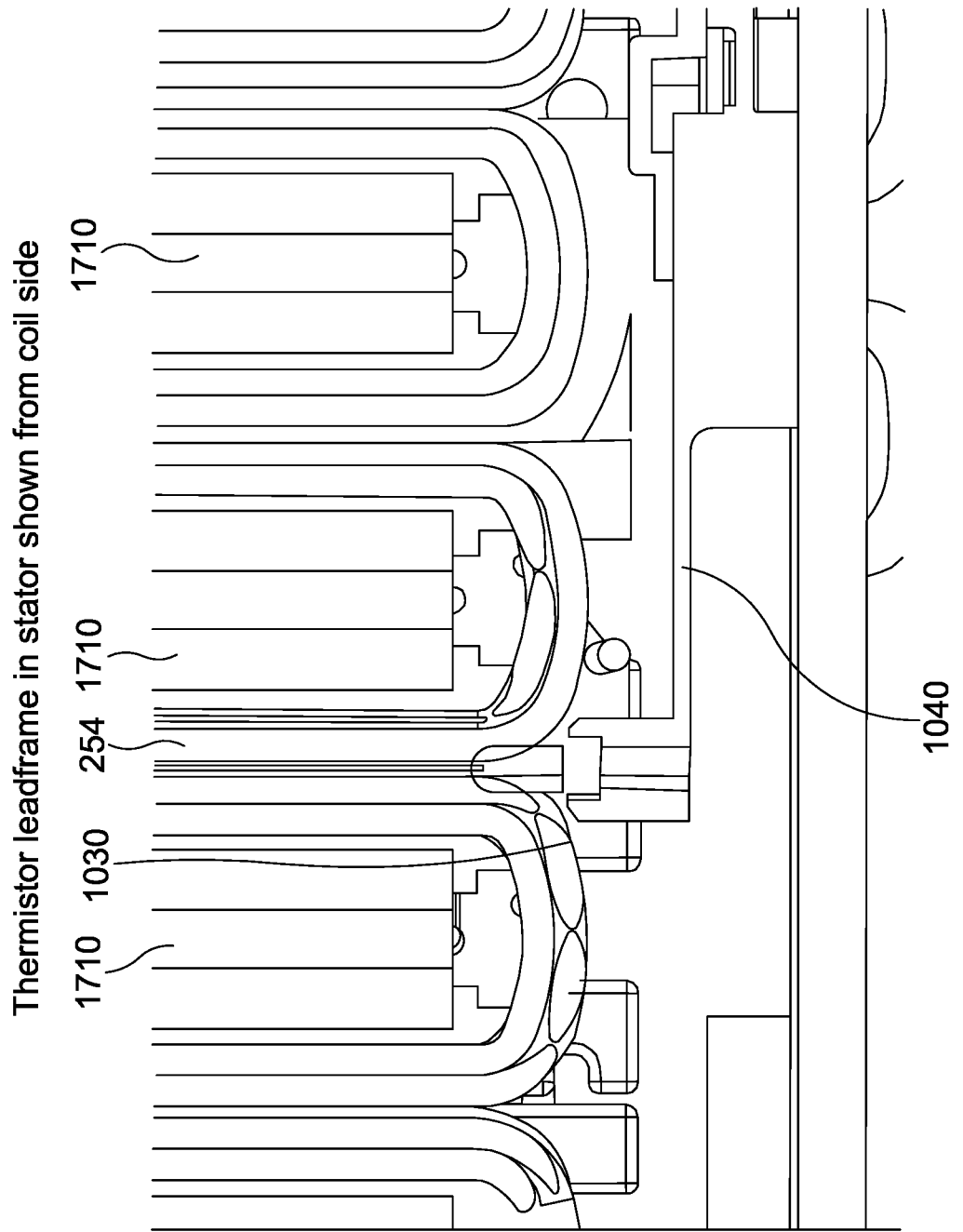

STATOR FOR AN ELECTRIC MOTOR OR GENERATOR

CROSS-REFERENCE TO RELATED APPLICATIONS

This application is a 371 Application of International Patent Application Serial No. PCT/IB2015/058068, entitled, "STATOR FOR AN ELECTRIC MOTOR OR GENERATOR, filed Oct. 20, 2015, which claims priority to GB Application No. 1419416.1, filed Oct. 31, 2014.

The present invention relates to a stator, in particular a stator for an electric motor or generator arranged to monitor the operating temperature of the electric motor or generator.

Electric motor systems typically include an electric motor, with a control unit arranged to control the power of the electric motor. Examples of known types of electric motor include the induction motor, synchronous brushless permanent magnet motor, switched reluctance motor and linear motor. In the commercial arena three phase electric motors are the most common kind of electric motor available.

A three phase electric motor typically includes three coil sets, where each coil set is arranged to generate a magnetic field associated with one of the three phases of an alternating voltage.

To increase the number of magnetic poles formed within an electric motor, each coil set will typically have a number of coil sub-sets that are distributed around the periphery of the electric motor, which are driven to produce a rotating magnetic field.

By way of illustration, FIG. 1 shows a typical three phase electric motor 10 having three coil sets 14, 16, 18. Each coil set consists of four coil sub-sets that are connected in series, where for a given coil set the magnetic field generated by the respective coil sub-sets will have a common phase.

The three coil sets of a three phase electric motor are typically configured in either a delta or wye configuration.

A control unit for a three phase electric motor having a DC power supply will typically include a three phase bridge inverter that generates a three phase voltage supply for driving the electric motor. Each of the respective voltage phases is applied to a respective coil set of the electric motor.

A three phase bridge inverter includes a number of switching devices, for example power electronic switches such as Insulated Gate Bipolar Transistor (IgG) switches, which are used to generate an alternating voltage from a DC voltage supply.

When running, a motor has energy losses that are generally dominated by copper losses that increase approximately linearly with coil temperature and torque squared. This imposes thermal management problems for the motor as the losses manifest themselves as heat energy within the motor, where the principal source of heat is generated as a result of current flows within the coil windings.

As motor efficiency and performance is dependent upon the temperature of the motor and components can degrade with increased temperature, it is desirable for an electric motor to be operated within a range of temperature values, which typically requires the temperature of the electric motor to be monitored.

However, placement of temperature sensors within an electric motor can be problematic as reliable contact with coil windings, the principal source of heat within an electric motor, can be difficult to achieve.

It is desirable to improve this situation.

In accordance with an aspect of the present invention there is provided a stator according to the accompanying claims.

The present invention provides the advantage of allowing reliable and consistent contact to be achieved between a temperature sensor and coil windings within an electric motor or generator by providing a mechanism to allow a temperature sensor to be sprung loaded against the coil windings of an electric motor or generator.

The present invention will now be described, by way of example, with reference to the accompanying drawings, in which:

FIG. 17 illustrates a thermistor sprung biased against coil windings mounted on a stator according to an embodiment of the present invention.

The embodiment of the invention described is for a stator having a temperature sensing element, for example a thermistor, that is attached to the stator via a resiliently deformable element. The stator forms part of an electric motor or generator, where preferably the electric motor is for use in a wheel of a vehicle. However the electric motor may be located anywhere within the vehicle. The motor is of the type having a set of coils being part of the stator for attachment to a vehicle, radially surrounded by a rotor carrying a set of magnets for attachment to a wheel. For the avoidance of doubt, the various aspects of the invention are equally applicable to an electric generator having the same arrangement. As such, the definition of electric motor is intended to include electric generator. In addition, some of the aspects of the invention are applicable to an arrangement having the rotor centrally mounted within radially surrounding coils. As would be appreciated by a person skilled in the art, the present invention is applicable for use with other types of electric motors.

Figure 1:
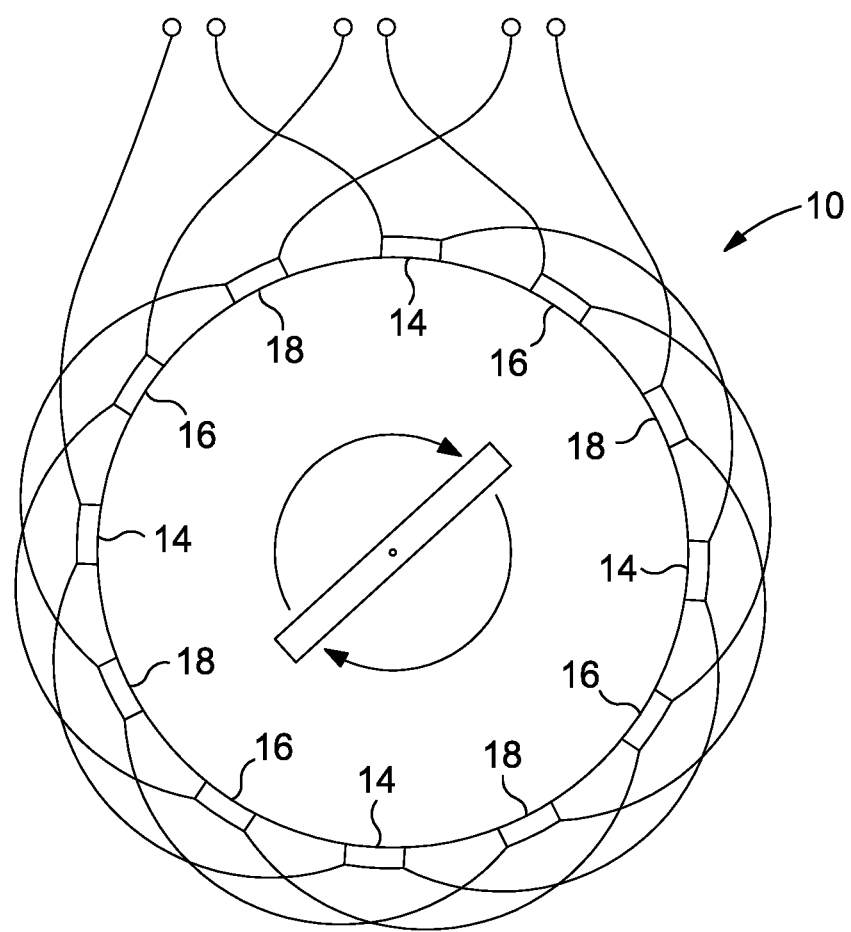
FIG. 1 illustrates a prior art three phase electric motor.
Figure 2:
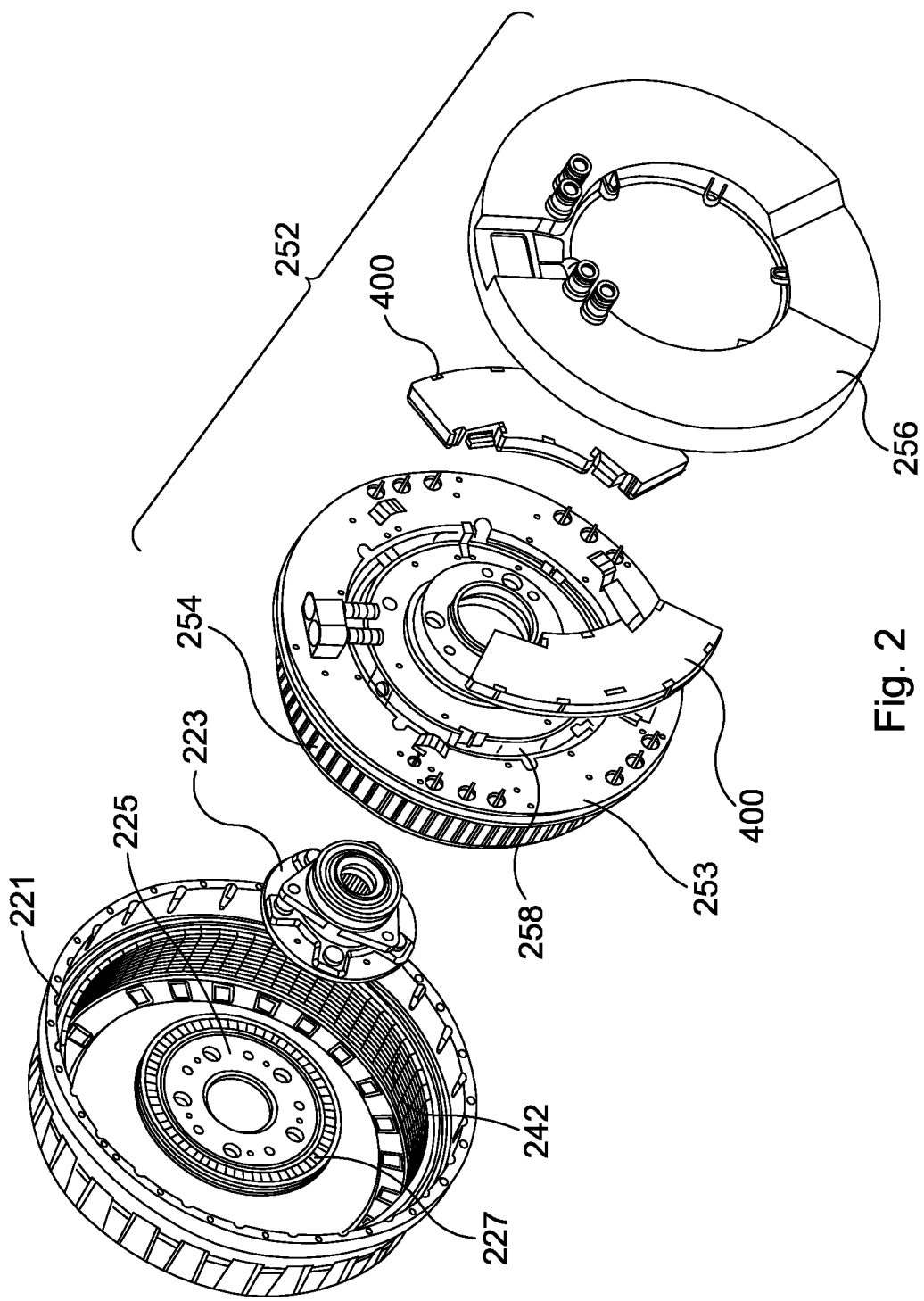
FIG. 2 illustrates an exploded view of a motor embodying the present invention.
Figure 3:
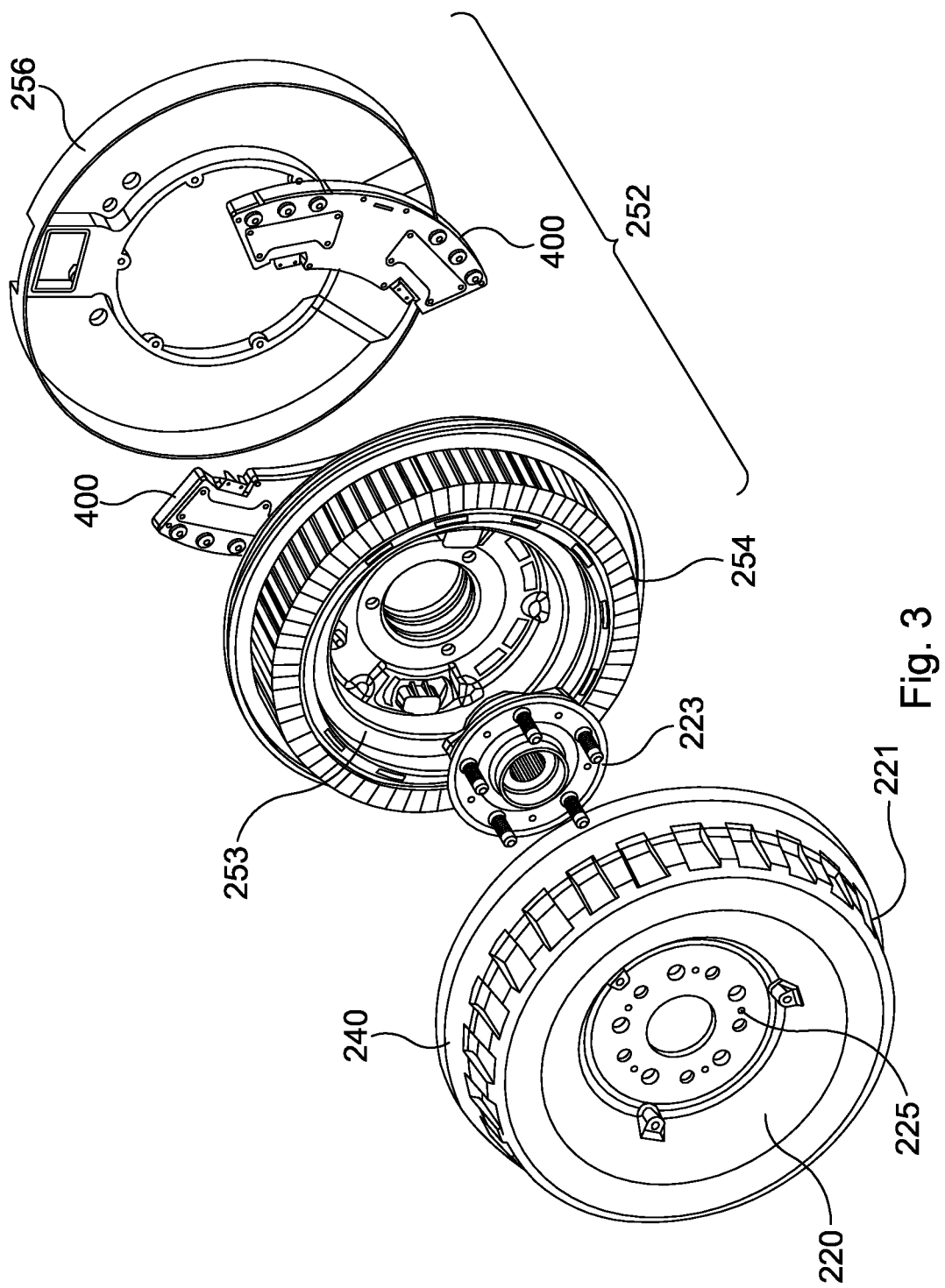
FIG. 3 illustrates an exploded view of the electric motor shown in FIG. 1 from an alternative angle.

For the purposes of the present embodiment, as illustrated in FIG. 2 and FIG. 3, the in-wheel electric motor includes a stator 252 comprising a heat sink 253 that acts as a circumferential support for the stator 252, a thermistor lead frame (not shown), a stator back-iron (not shown), multiple coils 254, two control devices 400 mounted on the heat sink 253 on a rear portion of the stator for driving the coils, and an annular capacitor (not shown), otherwise known as a DC link capacitor, mounted in a recess 258 on the stator within the inner radius of the control devices 400. The coils 254 are formed on stator tooth laminations, which are mounted on the stator back-iron, to form coil windings. A stator cover 256 is mounted on the rear portion of the stator 252, enclosing the control devices 400 to form the stator 252, which may then be fixed to a vehicle and does not rotate relative to the vehicle during use.

Figure 4:
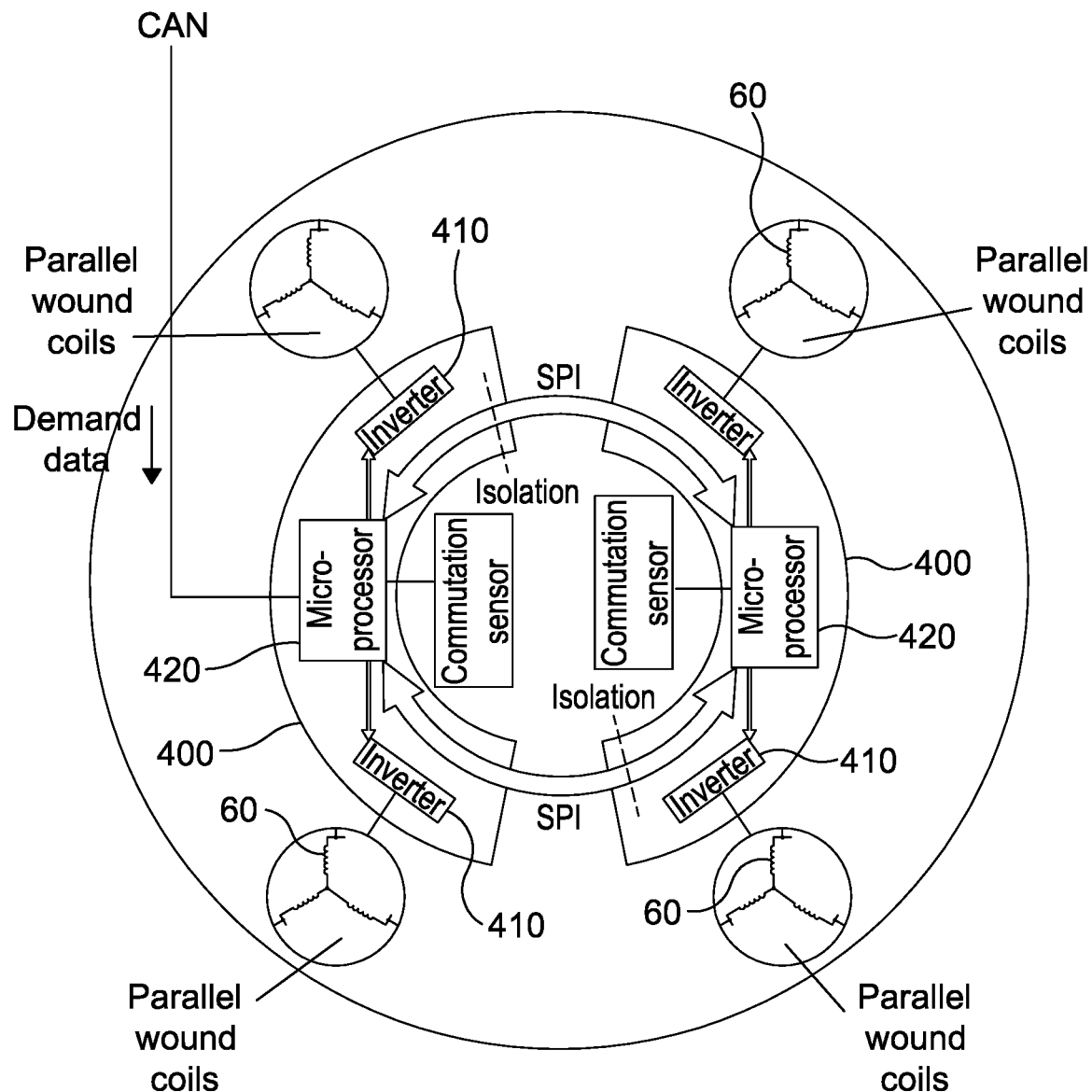
FIG. 4 illustrates an electric motor according to an embodiment of the present invention.

Each control device 400 includes two inverters 410 and control logic 420, which in the present embodiment includes a processor, for controlling the operation of the inverters 410, which is schematically represented in FIG. 4.

The annular capacitor is coupled between the inverters 410 and the electric motor's DC power source for reducing voltage ripple on the electric motor's power supply line, otherwise known as the DC bus bar, and for reducing voltage overshoots during operation of the electric motor. For reduced inductance the capacitor is preferably mounted adjacent to the control devices 400.

A rotor 240 comprises a front portion 220 and a cylindrical portion 221 forming a cover, which substantially surrounds the stator 252. The rotor includes a plurality of permanent magnets 242 arranged around the inside of the cylindrical portion 221. For the purposes of the present embodiment 32 magnet pairs are mounted on the inside of the cylindrical portion 221. However, any number of magnet pairs may be used.

The magnets are in close proximity to the coil windings on the stator 252 so that magnetic fields generated by the coils interact with the magnets 242 arranged around the inside of the cylindrical portion 221 of the rotor 240 to cause the rotor 240 to rotate. As the permanent magnets 242 are utilized to generate a drive torque for driving the electric motor, the permanent magnets are typically called drive magnets.

The rotor 240 is attached to the stator 252 by a bearing block 223. The bearing block 223 can be a standard bearing block as would be used in a vehicle to which this motor assembly is to be fitted. The bearing block comprises two parts, a first part fixed to the stator and a second part fixed to the rotor. The bearing block is fixed to a central portion 253 of the wall of the stator 252 and also to a central portion 225 of the housing wall 220 of the rotor 240. The rotor 240 is thus rotationally fixed to the vehicle with which it is to be used via the bearing block 223 at the central portion 225 of the rotor 240. This has an advantage in that a wheel rim and tire can then be fixed to the rotor 240 at the central portion 225 using the normal wheel bolts to fix the wheel rim to the central portion of the rotor and consequently firmly onto the rotatable side of the bearing block 223. The wheel bolts may be fitted through the central portion 225 of the rotor through into the bearing block itself. With both the rotor 240 and the wheel being mounted to the bearing block 223 there is a one to one correspondence between the angle of rotation of the rotor and the wheel.

FIG. 3 shows an exploded view of the same motor assembly illustrated in FIG. 2 from the opposite side. The rotor 240 comprises the outer rotor wall 220 and circumferential wall 221 within which magnets 242 are circumferentially arranged. As previously described, the stator 252 is connected to the rotor 240 via the bearing block at the central portions of the rotor and stator walls.

A V shaped seal is provided between the circumferential wall 221 of the rotor and the outer edge of the stator.

The rotor also includes a set of magnets 227 for position sensing, otherwise known as commutation magnets, which in conjunction with sensors mounted on the stator allows for a rotor flux angle to be estimated. The rotor flux angle defines the positional relationship of the drive magnets to the coil windings. Alternatively, in place of a set of separate magnets the rotor may include a ring of magnetic material that has multiple poles that act as a set of separate magnets.

To allow the commutation magnets to be used to calculate a rotor flux angle, preferably each drive magnet has an associated commutation magnet, where the rotor flux angle is derived from the flux angle associated with the set of commutation magnets by calibrating the measured commutation magnet flux angle. To simplify the correlation between the commutation magnet flux angle and the rotor flux angle, preferably the set of commutation magnets has the same number of magnets or magnet pole pairs as the set of drive magnet pairs, where the commutation magnets and associated drive magnets are approximately radially aligned with each other. Accordingly, for the purposes of the present embodiment the set of commutation magnets has 32 magnet pairs, where each magnet pair is approximately radially aligned with a respective drive magnet pair.

A sensor, which in this embodiment is a Hall sensor, is mounted on the stator. The sensor is positioned so that as the rotor rotates each of the commutation magnets that form the commutation magnet ring respectively rotates past the sensor.

As the rotor rotates relative to the stator the commutation magnets correspondingly rotate past the sensor with the Hall sensor outputting an AC voltage signal, where the sensor outputs a complete voltage cycle of 360 electrical degrees for each magnet pair that passes the sensor.

For improved position detection, preferably the sensor includes an associated second sensor placed 90 electrical degrees displaced from the first sensor.

As illustrated schematically in FIG. 4, in the present embodiment the electric motor includes four coil sets 60 with each coil set 60 having three coil sub-sets that are coupled in a wye configuration to form a three phase sub-motor, resulting in the motor having four three phase sub-motors. The operation of the respective sub-motors is controlled via one of two control devices 400. However, although the present embodiment describes an electric motor having four coil sets 60 (i.e. four sub motors) the motor may equally have one or more coil sets with associated control devices. In a preferred embodiment the motor 40 includes eight coil sets 60 with each coil set 60 having three coil sub-sets that are coupled in a wye configuration to form a three phase sub-motor, resulting in the motor having eight three phase sub-motors. Similarly, each coil set may have any number of coil sub-sets, thereby allowing each sub-motor to have two or more phases.

As illustrated in FIG. 4, each coil set 60 is connected to a respective three phase inverter 410 included on a control device 400. As is well known to a person skilled in the art, a three phase inverter contains six switches, where a three phase alternating voltage may be generated by the controlled operation of the six switches. However, the number of switches will depend upon the number of voltage phases to be applied to the respective sub motors, where the sub motors can be constructed to have any number of phases. Each control device 400 is arranged to communicate with the other control device 400 via a communication bus.

Figure 5:
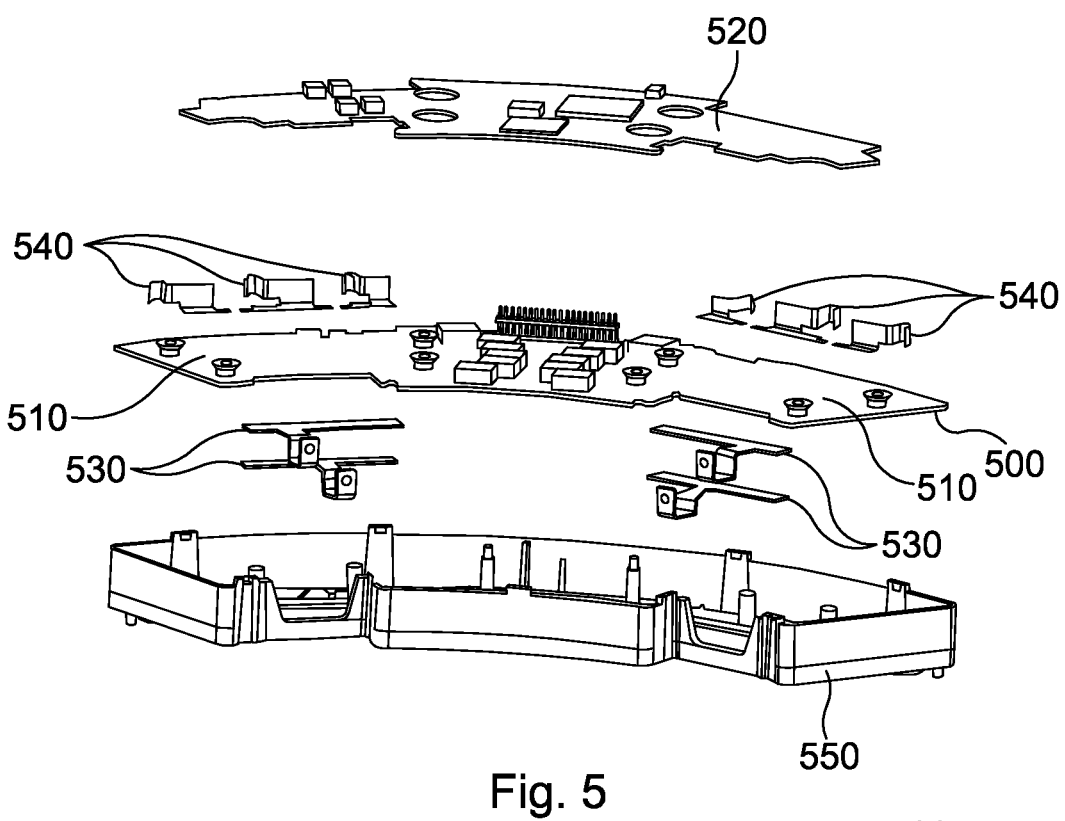
FIG. 5 illustrates an exploded view of a control device for an electric motor according to an embodiment of the present invention.

Preferably, the control devices 400 are of a modular construction. FIG. 5 illustrates an exploded view of a preferred embodiment, where each control device 400, otherwise known as a power module, includes a power printed circuit board 500 on which is mounted a control printed circuit board 520, four power source busbars 530 for connecting to a DC battery via the DC link capacitor, six phase winding busbars 540 for connecting to respective coil windings, and two power substrate assemblies 510, where each power substrate assembly 510 includes an inverter.

Figure 6:
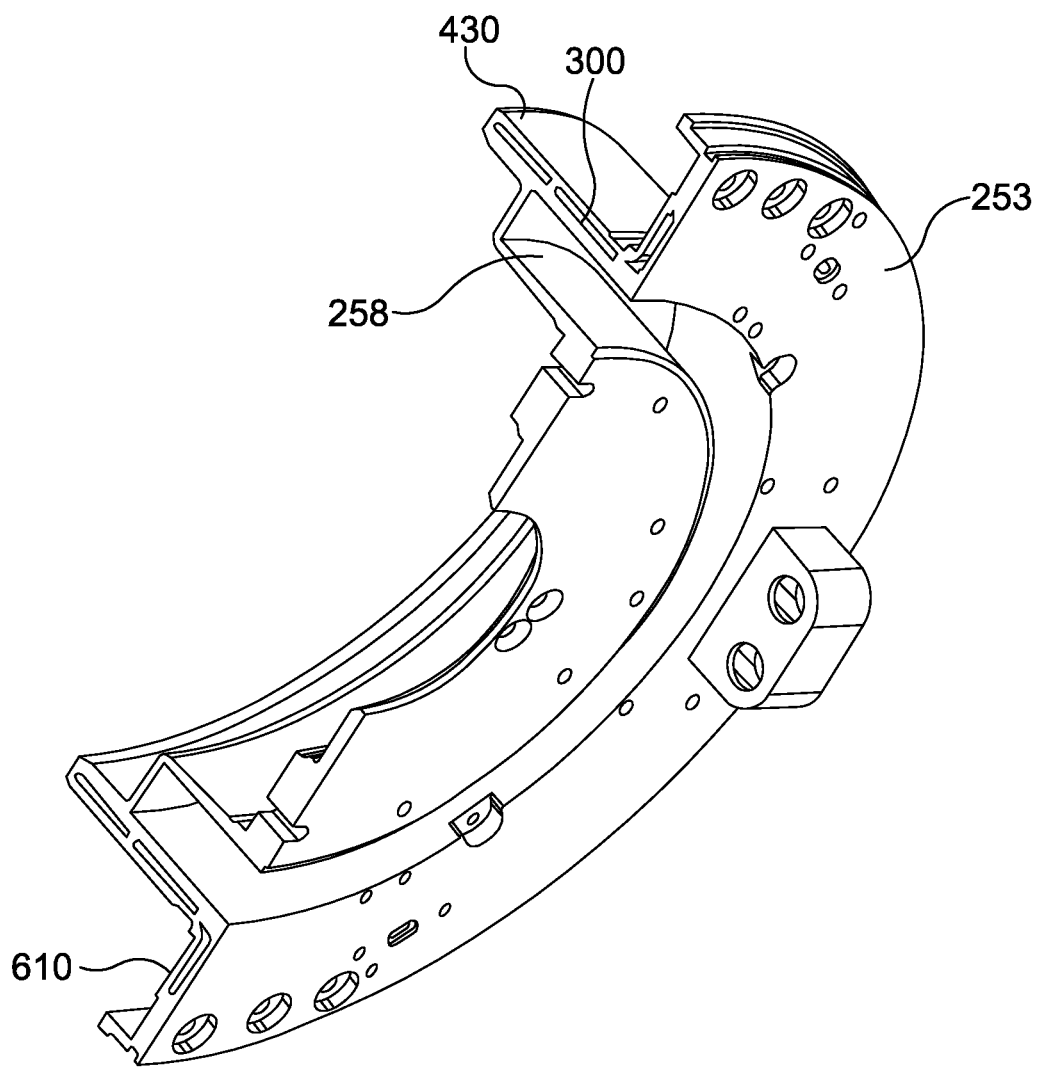
FIG. 6 illustrates a stator heat sink according to an embodiment of the present invention.
Figure 7:
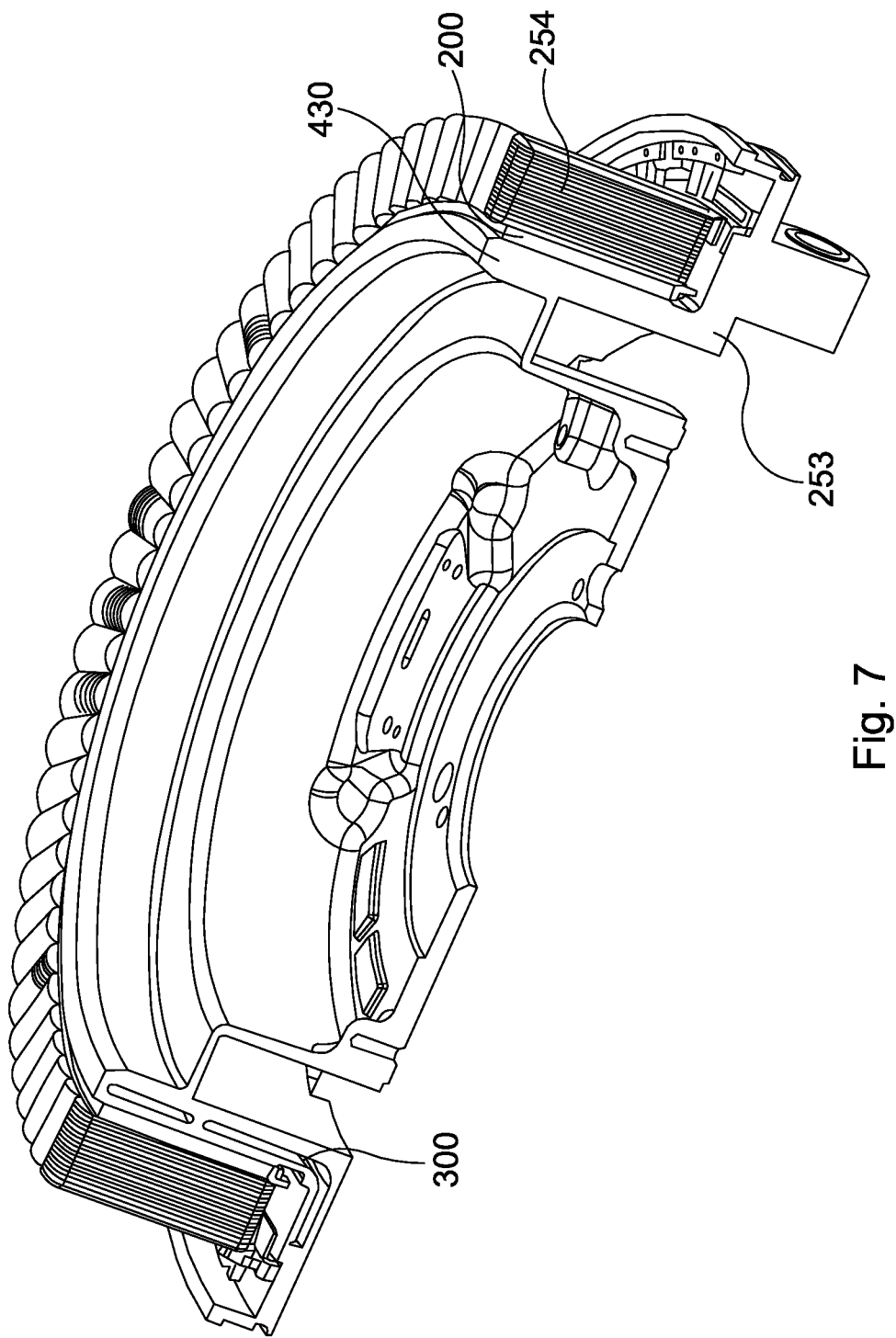
FIG. 7 illustrates a stator heat sink according to an embodiment of the present invention.

FIG. 6 illustrates a cross sectional view of the stator heat sink 253, where the stator heat sink 253 includes an extended circumferential support element 430 extending axially from a radial face 610. A circumferential stator back-iron 200, having stator teeth with coil wound upon the teeth, is arranged to be mounted on the circumferential support 430, as illustrated in FIG. 7. Preferably, for improved cooling between the stator heat sink 253 and the stator back-iron 200 the interface between the circumferential support 430 and the stator back-iron 200 is an interference fit. The circumferential stator back-iron 200 is mounted to the circumferential support 430 by any suitable means, for example using a hot drop technique.

As illustrated in FIGS. 6 and 7, a cooling channel 300 is formed in a circumferential portion of the stator heat sink 253. Coolant is arranged to flow around the cooling channel to provide cooling to the stator back-iron 200 and stator teeth mounted on the stator back-iron 200. Preferably, the cooling channel 300 also provides cooling to the DC link capacitor and control devices 400 mounted to the stator heat sink 253.

Figure 8:
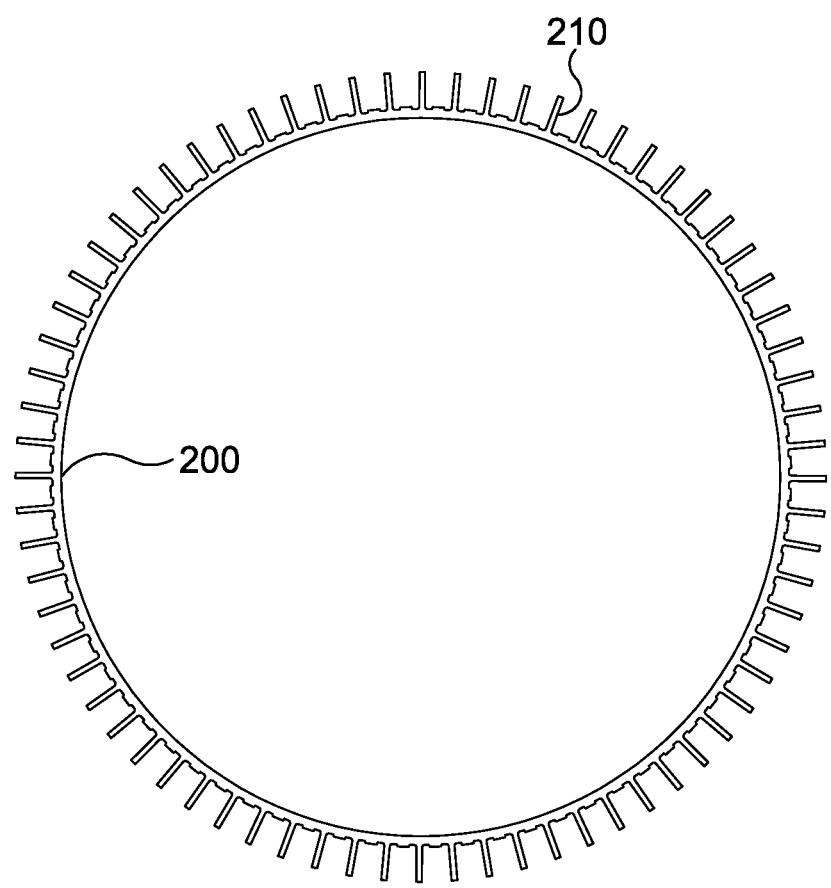
FIG. 8 illustrates a stator back-iron according to an embodiment of the present invention.

In a preferred embodiment, the stator back-iron 200, which preferably includes protrusions 210, for mounting stator teeth, is formed as a single piece, integral, structural component, as illustrated in FIG. 8. For example the stator back-iron 200 can be moulded from powder metal, or more commonly, built up of a number of identical laminations, where the laminations will typically be manufactured from sheets of steel, such as electrical steel, however any material with appropriate strength and electromagnetic properties can be used. The laminations may also have an insulating coating on the surface and along the curved interface shape between teeth stacks and the stator back-iron 200 to prevent eddy currents from flowing between the laminations.

The laminations can be produced by any suitable means, for example stamping or cutting the desired shape from a sheet of the required material or laser etching. As an example, the laminations may have a thickness of between 0.3 and 0.4 mm and preferably around 0.35 mm.

Although the present preferred embodiment describes stator teeth being mounted to protrusions on the stator back-iron 200 after the stator back-iron 200 has been manufactured, equally the stator back-iron 200 can be manufactured to include stator teeth.

As illustrated in FIG. 8, the stator back-iron protrusions 210 are distributed about the outer circumference of the stator back-iron 200 and act as engagement elements arranged to receive a stator tooth, where each stator tooth has a corresponding element to those on the stator back-iron 200 that are arranged to retain the respective stator teeth to the stator back-iron 200.

As the stator teeth are separate from the stator back-iron 200 they can be pre-wound with coil windings before the stator teeth are mounted to the stator back-iron 200 with the advantage that the winding of coils on the teeth is easier than if the teeth were integral to the stator support. For example, the slot fill (i.e. the amount of copper wire that fills the slots between stator teeth) for conventional electric motor designs will be of the order of 37%. However, by allow winding of coils to be applied to a stator tooth without the space constraints imposed when the stator is formed as a single piece with integral teeth the slot fill can be increase to approximately 54% or more.

Preferably, prior to the stator back-iron 200 being mounted to the circumferential support 430 the stator teeth are mounted to the stator back-iron 200, the stator teeth are radially pressed onto a respective stator back-iron protrusion 210 (i.e. engagement element), where, as stated above, the engagement element on the stator back-iron 200 and the engagement element of the stator tooth are arranged to retain the stator tooth to the stator back-iron.

Any suitable means may be used for retaining a stator tooth to the stator back-iron.

Figure 9:
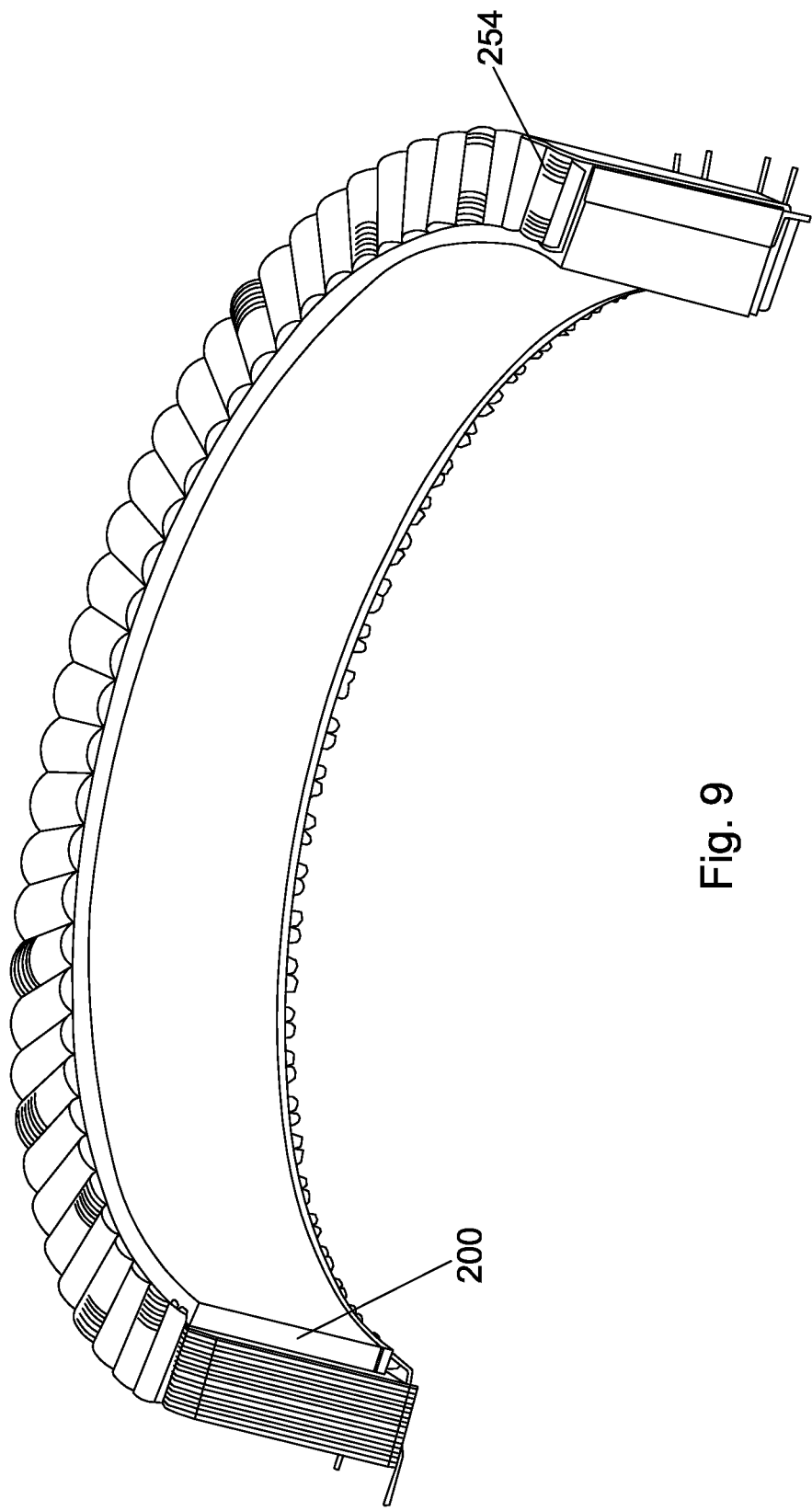
FIG. 9 illustrates a stator back-iron according to an embodiment of the present invention.

A cross sectional view of a stator back-iron 200, upon which are mounted a plurality of stator teeth, is illustrated in FIG. 9, with coil windings 254 formed on the respective stator teeth.

Within the present embodiment, in which the electric motor includes four coil sets with each coil set having three coil sub-sets, the coil windings 254 are arranged in groups of six, where the coil windings on six adjacent teeth correspond to one coil subset for one of the coil sets. Accordingly, within the present embodiment, there are seventy two stator teeth and associated coil windings. However, the coil windings can be arranged in any configuration.

Figure 10:
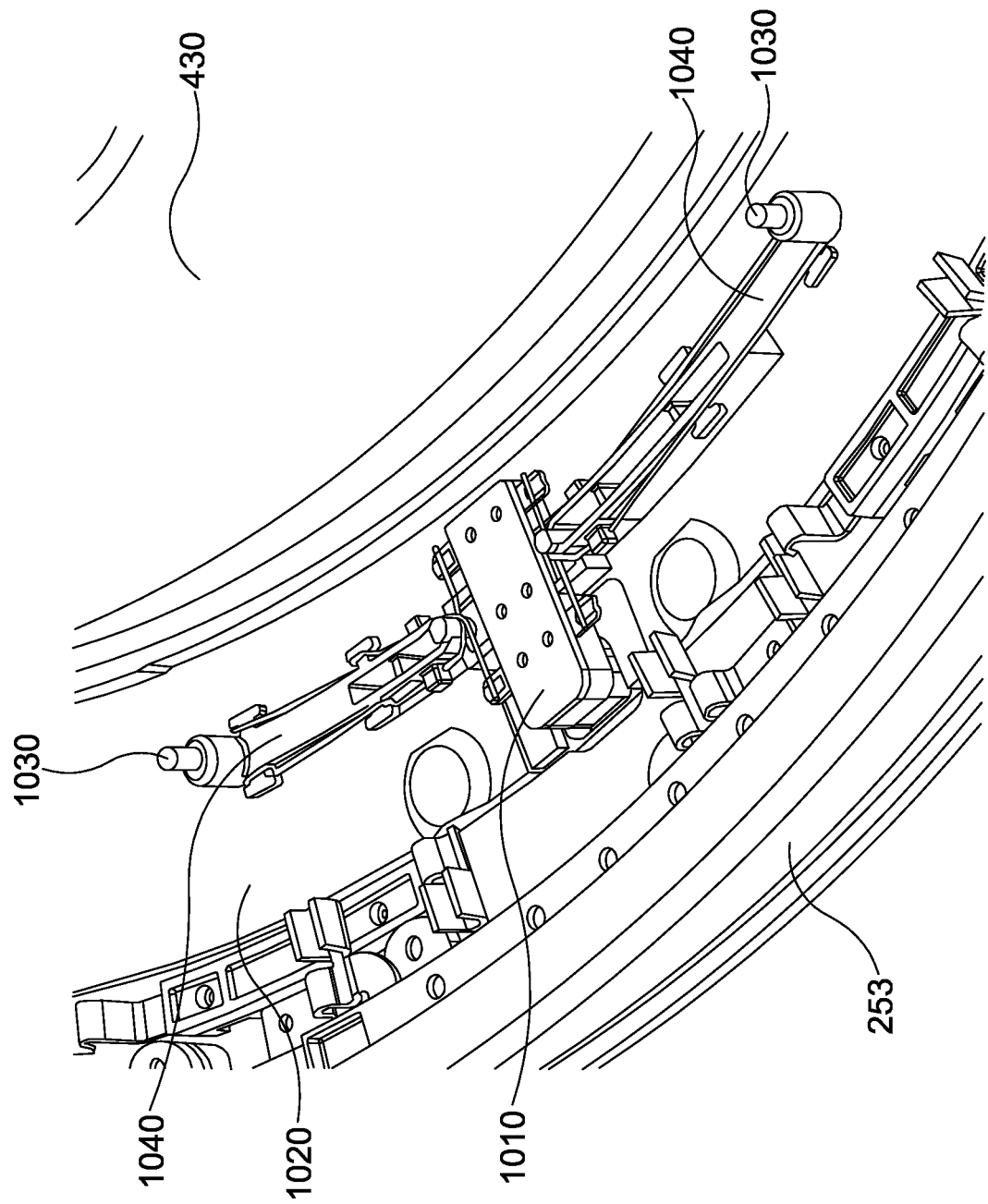
FIG. 10 illustrates a stator heat sink and thermistor lead frame according to an embodiment of the present invention.

As illustrated in FIG. 10, a thermistor lead frame 1010 is mounted on the outer edge of the stator heat sink's radial face 1020 in a plane perpendicular to the stators axis and perpendicular to the circumferential support 430. The thermistor lead frame 1010 is mounted on the same radial face of the stator heat sink 253 as that upon which the circumferential support 430 is formed. The thermistor lead frame 1010 includes two thermistors 1030, where each thermistor 1030 is arranged to monitor the temperature of coil windings mounted on a respective stator teeth. Each thermistor 1030 is mounted on a respective resiliently deformable arm 1040, as described below.

Although the preferred embodiment describes the thermistor lead frame 1010 as having two thermistors 1030 for monitoring the temperature of coil windings mounted on two separate stator teeth, the thermistor lead frame 1010 can have a single thermistor 1030 mounted on a single resiliently deformable arm or element for monitoring the temperature of coil windings on a single tooth. Alternatively, any number of thermistors 1030 can be mounted on the thermistor lead frame 1010. Equally, any temperature sensing element may be used in place of the thermistor, for example a resistance temperature detector.

Figure 11:
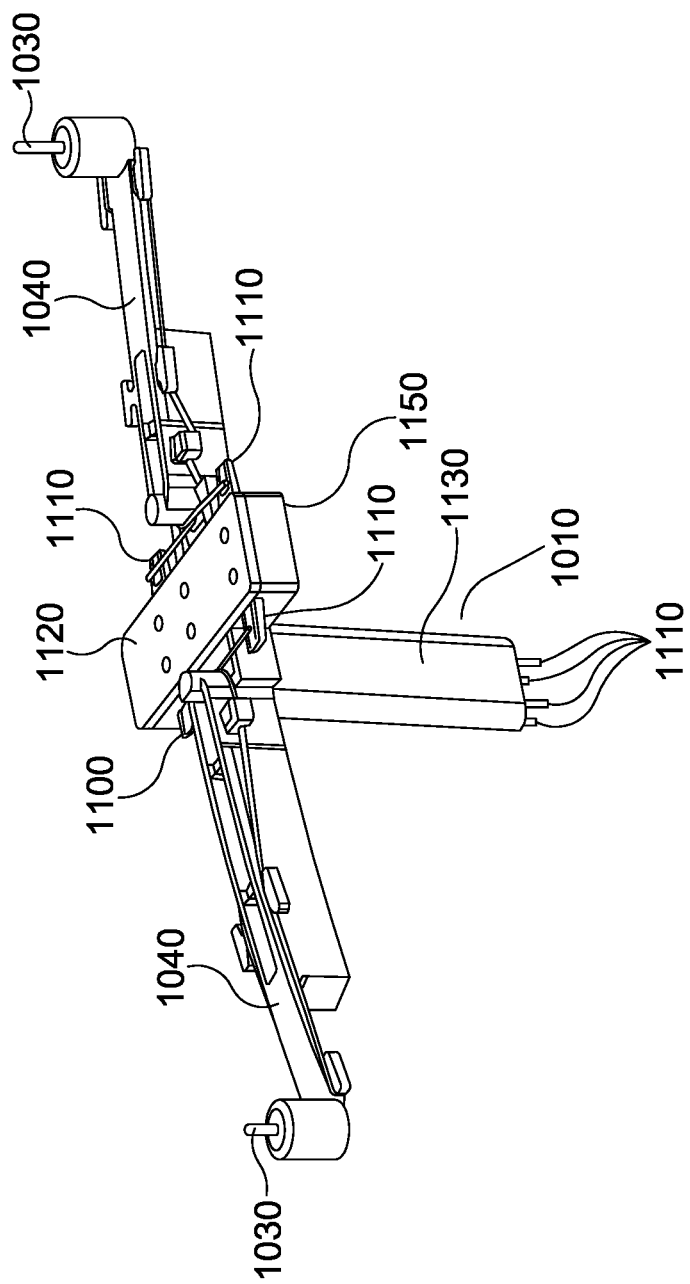
FIG. 11 illustrates a thermistor lead frame according to an embodiment of the present invention.

FIG. 11 illustrates a preferred embodiment of the thermistor lead frame 1010 prior to mounting on the stator heat sink 253. The thermistor lead frame 1010 includes four electrical coupling elements 1110 encapsulated within a plastics housing, where the plastics housing includes a mounting section 1120, a coupling section 1130 formed perpendicular to the mounting section 1120 and the two resiliently deformable arms 1040. The two resiliently deformable arms 1040 are formed on opposite edges/sides of the mounting section 1120 and extending in a direction perpendicular to the longitudinal axis of the coupling section 1130 and the mounting section 1120.

The mounting section 1120 has an inner surface 1150 arranged to sit flush with the outer edge of the stator heat sink's radial face 1020 when the thermistor lead frame 1010 is mounted to the stator heat sink 253. At the end section of each resiliently deformable arm 1040 is mounted a thermistor 1030, which is oriented on its respectively resiliently deformable arms 1040 in a direction towards the coil windings 254 mounted on the stator teeth when mounted to the stator heat sink 253.

Figure 12:
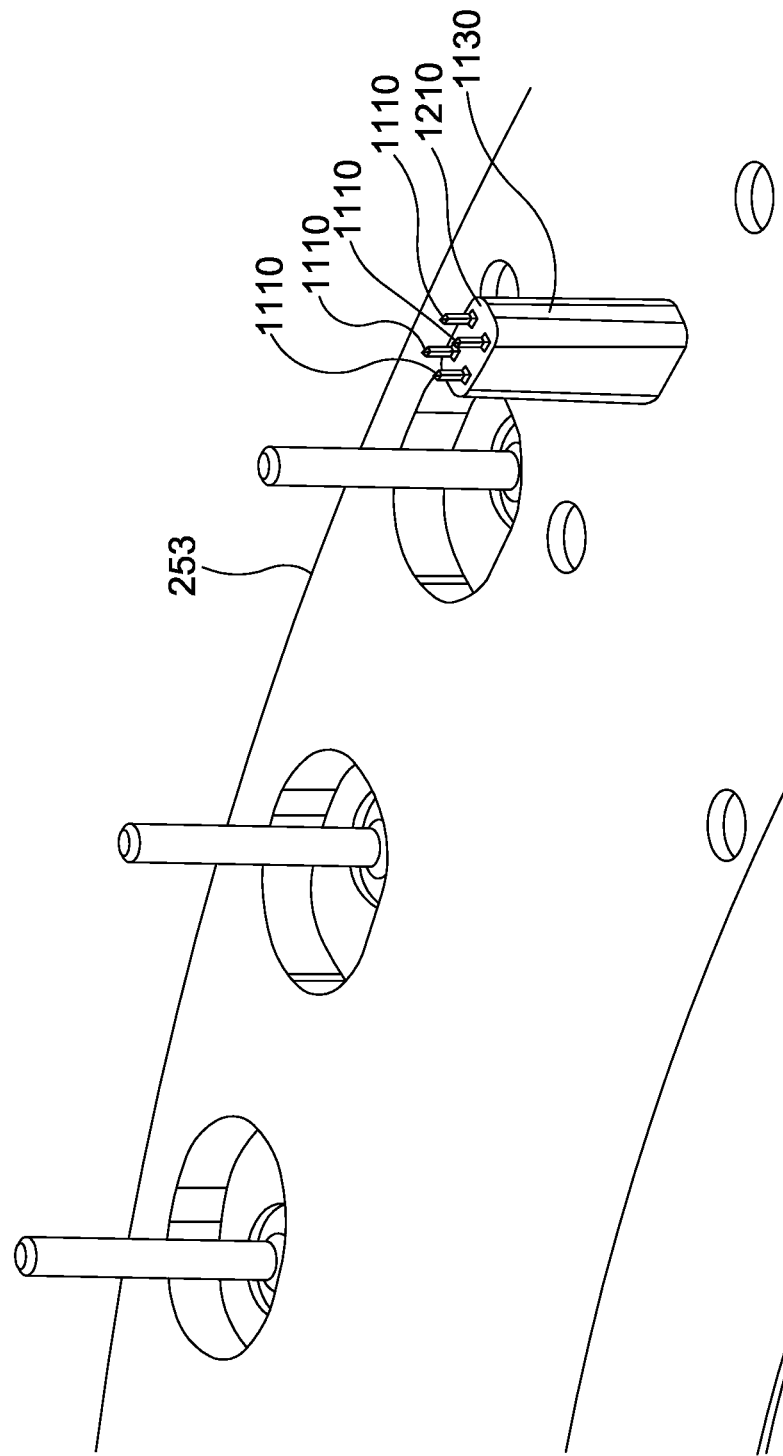
FIG. 12 illustrates a partial view of a stator heat sink according to an embodiment of the present invention.
Figure 13:
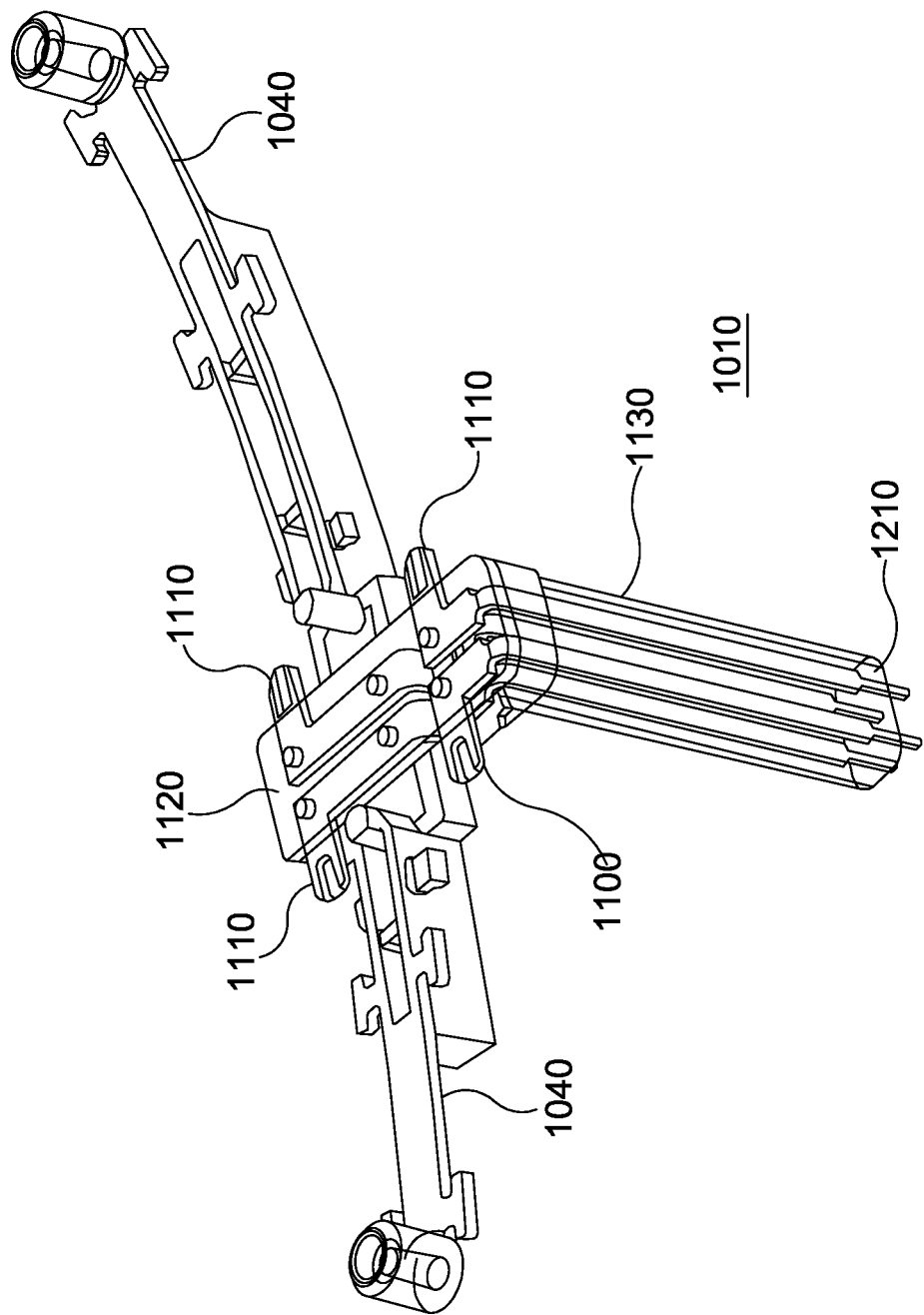
FIG. 13 illustrates a transparency of a thermistor lead frame according to an embodiment of the present invention.

When mounting the thermistor lead frame 1010 to the stator heat sink 253, the coupling section 1130 of the thermistor lead frame 1010 is arranged to extend through an aperture in the outer edge of the stator heat sink's radial face 1020, as illustrated in FIG. 12, which shows the end of the thermistor lead frame coupling section 1130 extending through the opposite radial face of the stator heat sink 253 to that on which the thermistor lead frame 1010 is mounted. The coupling section 1130 allows the thermistor lead frame 1010 to be electrically coupled to one of the control devices 400. The electrical coupling elements 1110 have a first coupling section at one end of the respective electrical coupling element 1110, which extends out of the end face 1210 of the coupling section 1130, and a second coupling section at the other end of the electrical coupling element 1110, which extends out of the mounting section 1120, as illustrated in FIG. 13, where FIG. 13 shows a transparent view of the thermistor lead frame 1030. The electrical coupling elements 1110 allow the control devices 400 to be coupled to the thermistors 1030, thereby allowing the control device 400 to monitor the temperature of the coil windings 254, as described below.

Figure 14:
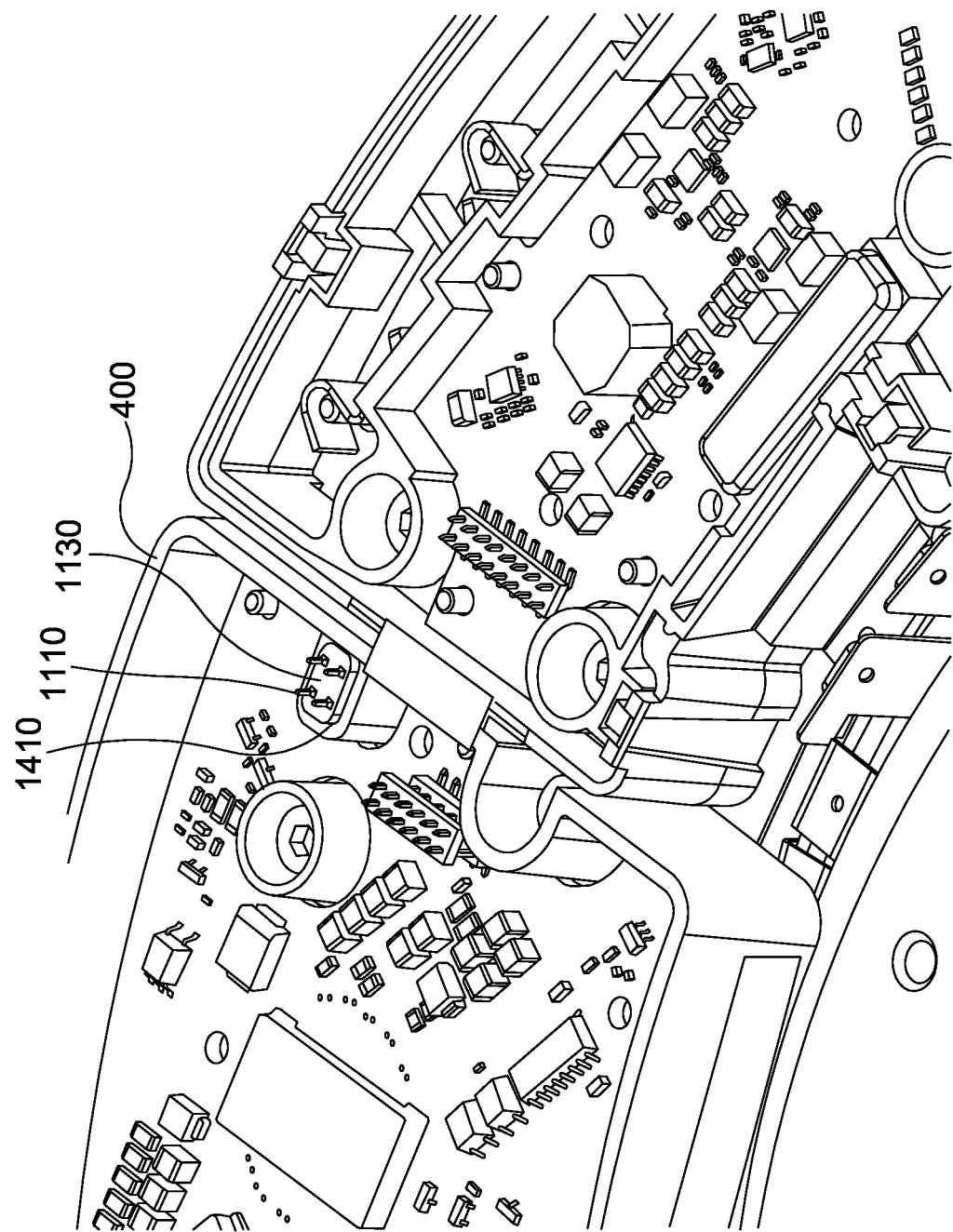
FIG. 14 illustrates a partial view of a control device mounted to a stator heat sink according to an embodiment of the present invention.

FIG. 14 shows a control device 400 mounted on the opposite radial face of the stator heat sink 253 to that on which the thermistor lead frame 1010 is mounted. The control device 400 has a cut-out section 1410 to allow the end of the thermistor lead frame coupling section 1130 to extend through.

Figure 15:
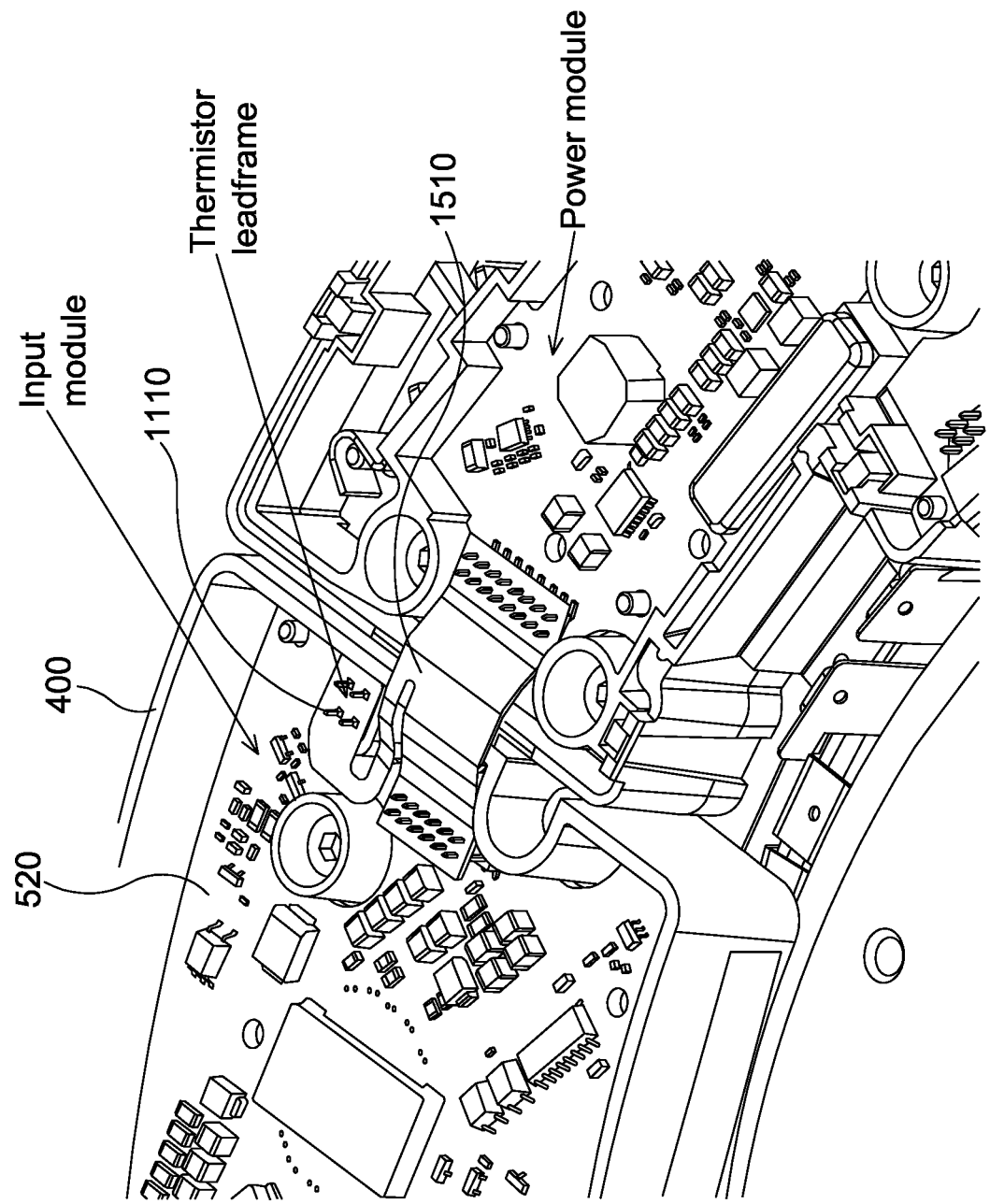
FIG. 15 illustrates a partial view of a control device mounted to a stator heat sink according to an embodiment of the present invention.

FIG. 15 shows an electrical coupling element 1510 electrically coupling the electrical coupling elements 1110 extending from the end face 1210 of the thermistor lead frame's coupling section 1130 to the control printed circuit board 520 mounted within the control device 400 to allow the control device 400 to measure the temperature of the thermistor 1030.

To ensure the measurement characteristics of each thermistor 1030 is the substantially the same, the length of the leads from both thermistors 1030 to the second coupling section of the respective electrical coupling elements 1110 are preferably substantially the same length.

To allow the temperature of coil windings 254 on different coil sub-sets to be monitored, the thermistors 1030 mounted on the respective resiliently deformable arms may need to be mounted at different distances from the thermistor lead frame mounting section 1120. Consequently, the length of the resiliently deformable arms 1140 may need to be different lengths.

Figure 16:
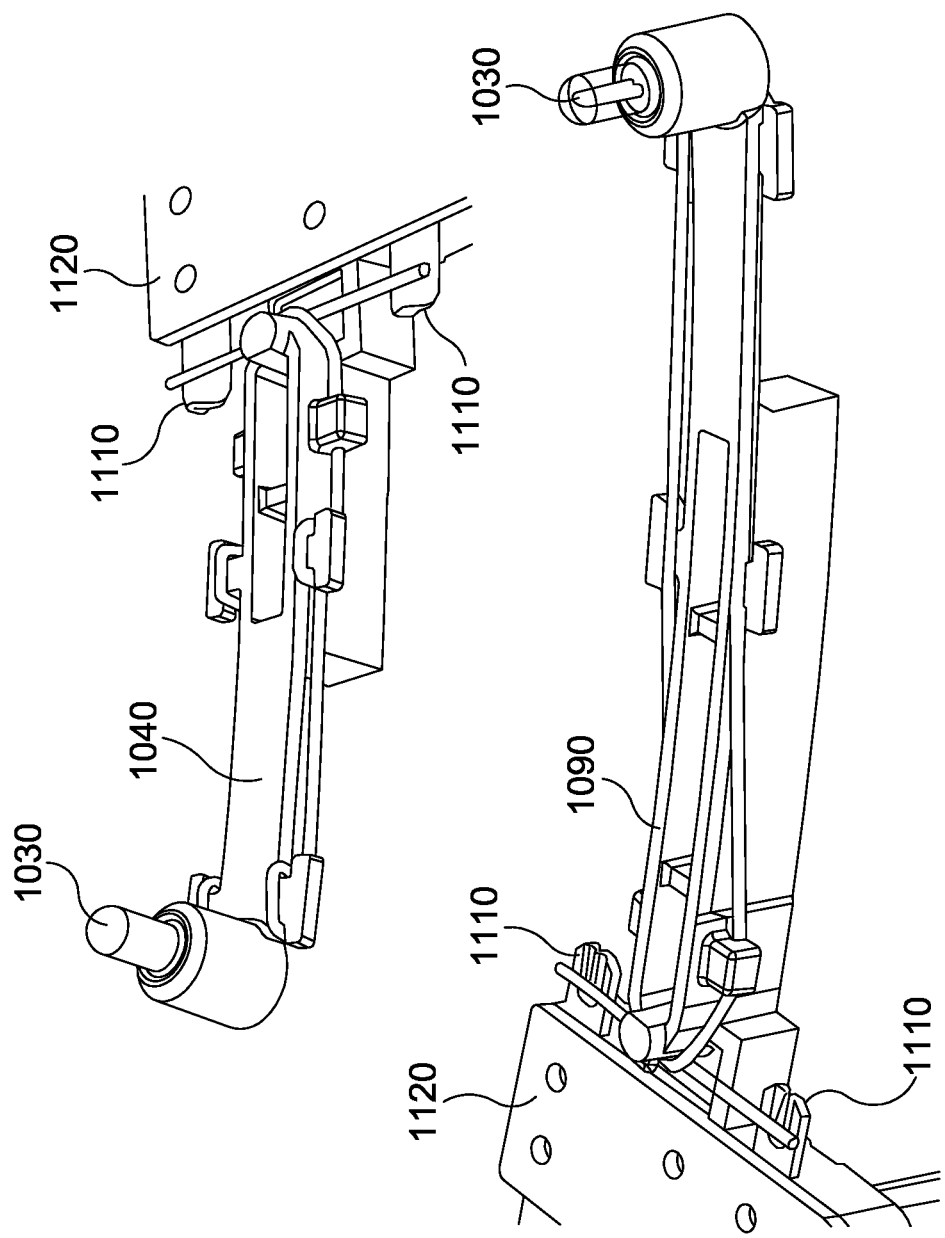
FIG. 16 illustrates a thermistor lead frame according to an embodiment of the present invention.

To accommodate thermistor leads from both thermistors 1030, which are substantially the same length, the resiliently deformable arms 1140 are arranged to allow the thermistor leads, to be routed in a manner to allow the leads from each thermistor 1030 to be secured to the resiliently deformable arms 1140, despite the different lengths of the thermistor leads, as illustrated in FIG. 16.

When the thermistor lead frame 1010 is mounted to the stator heat sink 253 the respective thermistors 1030 are located in a first position, where the thermistors 1030 are arranged to extend over the circumferential support 430 in a region the coils windings 254 will occupy when the stator back-iron 200 is mounted on the circumferential support 430. As the stator back-iron 200 is being mounted onto the circumferential support 430, the coil windings 254 mounted on respective stator teeth are arranged to engage with the thermistors 1030.

As the coil windings 254 engage with the thermisors 1030 the respective deformable arms allow the thermistors 1030 to be pushed back by the coil windings 254 causing the respective thermistors 1030 to be moved to a second position. In the second position the thermistors 1030 are closer to the outer edge of the stator heat sink radial face 1020 with the thermistors 1030 being sprung loaded against the respective coil windings 254 as a result of the resiliently deformable arms 1140 of the thermistor lead frame 1010 providing a spring bias to the thermistors 1030. Consequently, the thermistors 1030 are forced against the respective coil windings 254, thereby ensuring the thermistors 1030 are in contact with the coil windings 254.

As stated above, the stator back-iron 200 may be mounted to the stator's circumferential support 430 using any suitable means that prevents rotation of the stator back-iron 200 relative to the circumferential support 430 once the stator back-iron 200 has been mounted to the circumferential support 430, for example using a hot drop technique that allows the stator back-iron 200 to be mounted to the circumferential support 430 with an interference fit.

FIG. 17 illustrates a top view of the stator heat sink 253 with the stator teeth 1710 and coil windings 254 mounted on the stator heat sink 253. The coil windings 254 are engaged with the thermistor 1030 mounted on one of the thermistor lead frames resiliently deformable arms 1040. The position of the coil windings 254 have moved the thermistor 1030 from its first, unsprung, position to its second position, with the resiliently deformable arm 1040 providing a resilient bias such that the thermistor 1030 is sprung loaded against the coil windings 254.

Although the present embodiment describes the stator teeth being mounted to the circumferential support 430 once they have been mounted/formed on the stator back-iron 200, which is then mounted to the stator heat sink's circumferential support 430, the stator teeth may be mounted to the stator heat sink 253 in other ways that allow the thermistor 1030 to be sprung loaded against coil windings 254 mounted on a stator tooth once the stator tooth has been mounted to the stator heat sink's circumferential support 430. For example, the stator back-iron 200 may be mounted or formed on the stator heat sink's circumferential support 430 without teeth having first been mounted onto the stator back-iron 200. Once the stator back-iron 200 has been mounted to the stator heat sink's circumferential support 430, the stator teeth, and associated coil windings 254 are then mounted to the stator back-iron 200, for example in a radial or axial direction, where the mounting of the stator teeth to the stator back-iron 200 cause a thermistor 1030 to be moved from a first, un-sprung, position to a second, biased, position, where a spring bias provided by a resiliently deformable arm or element, ensures that the thermistor 1030 is maintained in contact with the coil windings 254 mounted on the stator teeth.

The invention claimed is:

1. A stator for an electric motor or generator, the stator comprising:
    a circumferential support including a back-iron and a heat sink, the heat sink defining a radial face;

a first resiliently deformable element mounted on the radial face of the heat sink of the circumferential support, the first resiliently deformable element comprising a first temperature sensing element;

a plurality of teeth for receiving coil windings; and means for mounting the plurality of teeth to the back-iron of the circumferential support; and wherein the first temperature sensing element is movable by the first resiliently deformable element from a first position before the plurality of teeth are mounted to the circumferential support to a second position when the plurality of teeth are mounted to the circumferential support.

2. A stator according to claim 1, wherein the means for mounting includes a plurality of first engagement elements distributed about the circumferential support.

3. A stator according to claim 2, wherein:

each tooth comprises a second engagement element to engage with one of the first engagement elements to mount the plurality of teeth to the circumferential support: and the stator further comprises coil windings received on a tooth of the plurality of teeth, the coil windings to engage with and bias the first temperature sensing element to the second position when the tooth is mounted to the circumferential support.

4. A stator according to claim 2, wherein the first engagement elements of the means for mounting comprises a plurality of protrusions extending radially from the back-iron.

5. A stator according to claim 1, further comprising coil windings received on the plurality of teeth.

6. A stator according to claim 5, wherein the coil windings on a tooth of the plurality of teeth engage with and bias the first temperature sensing element to the second position.

7. A stator according to claim 1, further comprising coil windings received on a tooth of the plurality of teeth, wherein the first resiliently deformable element provides a spring bias of the first temperature sensing element against the coil windings when the first temperature sensing element is in the second position.

8. A stator according to claim 1, wherein the first temperature sensing element is a thermistor or resistance temperature detector.

9. A stator according to claim 1, wherein the first resiliently deformable element and the first temperature sensing element form part of a lead frame mounted to the circumferential support.

10. A stator according to claim 9, wherein the lead frame includes a plastics housing that includes the first resiliently deformable element.

11. A stator according to claim 9, wherein the lead frame includes a first electrically conducting element for coupling the first temperature sensing element to a control device mounted on the circumferential support for monitoring temperature.

12. A stator according to claim 9, wherein the lead frame includes a second resiliently deformable element with a second temperature sensing element mounted on the second resiliently deformable element.

13. A stator according to claim 12, wherein the lead frame includes a second electrically conducting element for coupling the second temperature sensing element to a control device mounted on the circumferential support for monitoring temperature.

14. A stator according to claim 13, wherein the length of the first electrically conducting element for coupling the first temperature sensing element to the control device is substantially the same length as the second electrically conducting element for coupling the second temperature sensing element to the control device.

15. A stator according to claim 12, further comprising coil windings received on a tooth of the plurality of teeth, wherein the coil windings to engage with the second temperature sensing element when the tooth is mounted to the circumferential support, and the second resiliently deformable element to deform the coil windings on the tooth to engage with and bias the second temperature sensing element to the second position.

16. A stator according to claim 15, wherein the second temperature sensing element is arranged to determine the temperature of the coil windings on the tooth.

17. A stator according to claim 12, wherein the first resiliently deformable element forms a first arm on the lead frame and the second resiliently deformable element forms a second arm on the lead frame.

18. A stator according to claim 17, wherein the length of the first arm and the second arm are different.

19. A stator according to claim 1, further comprising coil windings received on a tooth of the plurality of teeth, wherein the first temperature sensing element is arranged to determine the temperature of the coil windings on the tooth.

20. A stator according to claim 1, wherein the heat sink and the back-iron of the circumferential support are formed of a single piece.

* * * * *